C. J. CLEMENTS.
EXPANSION BOLT.
APPLICATION FILED AUG. 10, 1907.
906,510.
Patented Dec. 15, 1908.
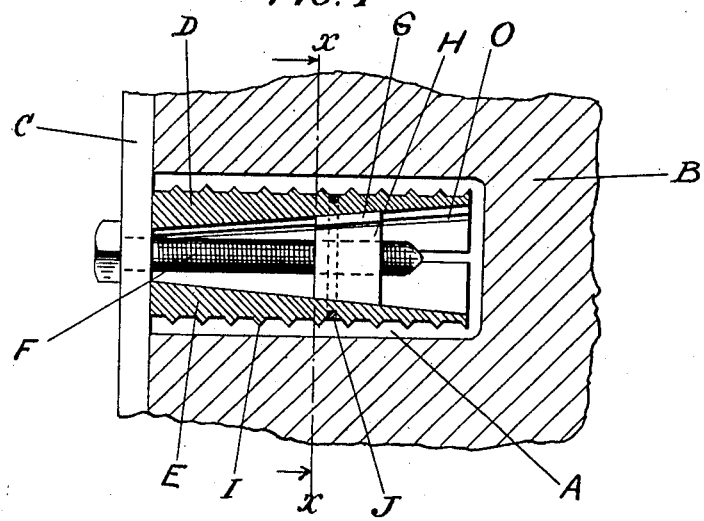
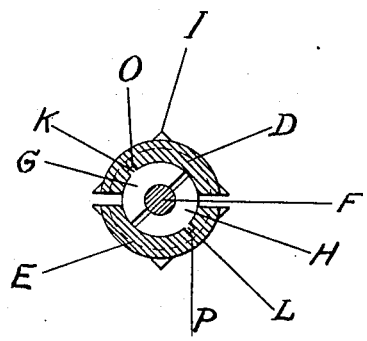
Witnesses
Ivan Konigsberg.
A. L. O'Brien.
Inventor
Charles J. Clements
By his Attorneys
Binney, Brickenstein & Ogden

UNITED STATES PATENT OFFICE.

CHARLES J. CLEMENTS, OF NEW YORK, N. Y.

EXPANSION-BOLT.

No. 906,510.  Specification of Letters Patent.  Patented Dec. 15, 1908.

Application filed August 10, 1907. Serial No. 387,972.

*To all whom it may concern:*

Be it known that I, CHARLES J. CLEMENTS, a citizen of the United States, and resident of the borough of Brooklyn, county of Kings, city and State of New York, have invented certain new and useful Improvements in Expansion-Bolts, of which the following is a specification, accompanied by drawings.

This invention relates to expansion bolts for use in stone, brick work and the like, and the objects of the invention are to improve upon the construction of such devices and render them stronger and more efficient in use than heretofore.

The invention consists of the expansion bolt substantially as hereinafter fully described and claimed in this specification and shown in the accompanying drawings, in which,—

Figure 1 is a longitudinal sectional view taken through an expansion bolt embodying the invention; Fig. 2 is a transverse sectional view on the line x x of Fig. 1, looking in the direction of the arrows.

Referring to the drawings the expansion bolt is shown in section in Fig. 1 adapted to be expanded in a recess A in the brickwork or masonry B, and C is the plate or other device adapted to be secured to the masonry.

D and E represent the halves of the longitudinally divided shell or cartridge and F is the bolt proper. The divided shell is provided with a central tapered bore constructed by tapering the interior of each of the shell portions D and E as shown. Coöperating with the tapered shell portions is the reversely tapered split wedge comprising the two halves G and H, which wedge is adapted to be expanded inside of the cartridge and force the shell portions D and E outwardly into engagement with the sides of the recess A. Preferably the outer sides of the shell portions of the cartridge are provided with teeth or serrations I for engagement with the masonry or other material, and a split band J is preferably provided around the cartridge, and countersunk in the shell portions for holding the parts together. The interior bore of the split wedge inside of the cartridge is screw-threaded to coöperate with the screw threads on the bolt F, so that by screwing up the bolt the split wedge expands the cartridge.

The portions G and H of the wedge or nut are provided with lugs K and L, coöperating with grooves O and P in the interior portions of the cartridge, so that the wedge is prevented from turning. Preferably the lugs K and L and grooves are so located inside of the shell portions of the cartridge that the split portions or meeting edges of the halves of the wedge do not fall opposite the meeting edges of the cartridge as illustrated in Fig. 2, thus making a very strong construction.

According to this invention it will be seen that the cartridge is continuously expanded, due to the reverse taper of the cartridge bore and the split wedge or nut, and this feature is a great advantage because the cartridge can be tightened up as fully as desired, and the limit of the expansion is not reached within a few turns of the bolt as in expansion bolts heretofore constructed in which the bore of the cartridge is made straight instead of tapered.

I claim and desire to obtain by Letters Patent the following:

An expansion bolt comprising an interiorly tapered shell composed of longitudinal sections and an exteriorly tapered nut composed of longitudinal sections, a groove and lug connection between each nut and shell sections, the sections of the shell being arranged to break joint with the sections of the nut, and means for moving said nut to expand said shell.

In testimony whereof I have signed this specification in the presence of two subscribing witnesses.

CHARLES J. CLEMENTS.

Witnesses:
 W. M. BRADEN,
 E. A. ANDERSON.